(12) United States Patent
Luo et al.

(10) Patent No.: US 9,520,933 B2
(45) Date of Patent: *Dec. 13, 2016

(54) METHOD AND APPARATUS FOR ENABLING MULTIPLE TRANSMISSION MODES BASED ON MULTIPLE SEARCH SPACES

(75) Inventors: Tao Luo, San Diego, CA (US); Wanshi Chen, San Diego, CA (US); Juan Montojo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1279 days.

This patent is subject to a terminal disclaimer.

(21) Appl. No.: 12/685,189

(22) Filed: Jan. 11, 2010

(65) Prior Publication Data

US 2010/0177700 A1    Jul. 15, 2010

Related U.S. Application Data

(60) Provisional application No. 61/144,082, filed on Jan. 12, 2009.

(51) Int. Cl.
| | |
|---|---|
| *H04J 3/16* | (2006.01) |
| *H04W 4/00* | (2009.01) |
| *H04B 7/06* | (2006.01) |
| *H04B 17/24* | (2015.01) |

(52) U.S. Cl.
CPC ............ *H04B 7/0689* (2013.01); *H04B 17/24* (2015.01)

(58) Field of Classification Search
CPC . H04W 72/1278; H04W 72/005; H04W 72/02

USPC ....... 370/203, 208, 209, 210, 329, 342, 320, 370/321, 335, 336, 337, 344, 347; 455/101, 115.3, 133–135, 103, 13.3, 455/63.1

See application file for complete search history.

(56) References Cited

U.S. PATENT DOCUMENTS

| | | | |
|---|---|---|---|
| 6,879,831 B2* | 4/2005 | Hamabe | 455/442 |
| 7,542,734 B2* | 6/2009 | Piirainen | 455/101 |
| 8,073,062 B2 | 12/2011 | Classon et al. | |
| 2008/0232492 A1 | 9/2008 | Xiao et al. | |
| 2009/0088148 A1* | 4/2009 | Chung et al. | 455/423 |
| 2009/0310476 A1 | 12/2009 | Seo et al. | |
| 2010/0034314 A1 | 2/2010 | Brown et al. | |
| 2010/0177810 A1* | 7/2010 | Luo et al. | 375/219 |
| 2011/0083066 A1 | 4/2011 | Chung et al. | |
| 2011/0194504 A1 | 8/2011 | Gorokhov et al. | |

FOREIGN PATENT DOCUMENTS

| | | |
|---|---|---|
| EP | 1944896 A1 | 7/2008 |
| EP | 1983781 A1 | 10/2008 |
| WO | 2007091317 A1 | 8/2007 |

OTHER PUBLICATIONS

International Search Report & Written Opinion—PCT/US2010/020776, International Search Authority—European Patent Office—Apr. 20, 2010.

(Continued)

*Primary Examiner* — Hanh N Nguyen
(74) *Attorney, Agent, or Firm* — Peng Zhu

(57) ABSTRACT

Certain aspects of the present disclosure relate to a technique for enabling multiple transmission modes based on control information of different formats.

30 Claims, 9 Drawing Sheets

(56) References Cited

OTHER PUBLICATIONS

Qualcomm Europe: "Clarifications of PDCCH Search Space" 3GPP Draft; RI-082543, 3rd Generation Partnership Project (3GPP), Mobile Competence Centre ; 650, Route Des Lucioles ; F-06921 Sophia-Antipolis Cedex ; France, vol. RAN WG1, No. Warsaw, Poland; 20080625, Jun. 25, 2008, XP050110805.
Texas Instruments et al: "Transmission scheme for transmission mode 7 with SPS C-RNTI" 3GPP Draft; RI-090277, 3rd Generation Partnership Project (3GPP), Mobile Competence Centre ; 650, Route Des Lucioles ; F-06921 Sophia-Antipolis Cedex.
CATT, RITT: "Reception of DCI format in transmission mode 7", 3GPP TSG-RAN WG1#55b, R1-090183, Jan. 8, 2009.
LG Electronics: "DCI formats and bit fields for SPS deactivation", 3GPP TSG-RAN WG1#55b, R1-090197, Jan. 16, 2008.
Qualcomm Europe: "PDCCH formats in support of DL-MIMO and BF operation", 3GPP Draft; R1-081958, 3rd Generation Partnership Project (3GPP), Mobile Competence Centre; 650, Route Des Lucioles; F-06921 Sophia-Antipolis Cedex; France, vol. RAN WG1, No. Kansas City, USA; 20080514, May 14, 2008, XP050110308.
Taiwan Search Report—TW099100751—TIPO—Jan. 15, 2013.
3GPP TSG RAN WG1 Meeting #53 bis R1-082606, Finalizing Multi-User MIMO for LTE Rel. 8, Nokia, Nokia Siemens Networks, Jun. 30-Jul. 4, 2008.
Nokia: Nokia Siemens Networks, DL Control Signalling for Dual-layer Beamforming in Rel'9[online] 3GPP TSG-RAN WG1#58 R1-093300, Aug. 18, 2009 URL:http://www.3gpp.org/ftp/tsgranWG1RL/TSGR158/Docs/R1-093300.zip.
Nortel Networks, "Support of Wider Bandwidth for LTE-Advanced" , 3GPP TSG-RAN1 #55, R1-084474, Nov. 14, 2008.
Philips., UE-specific RS pattern [online], 3GPP TSG-RAN WG1#51b R1-080451, Sep. 1, 2008 URL:http: //www.3gpp.org/ftp/tsgran/WG1RL1/TSGR151b/Docs/R1-080451.zip.

* cited by examiner

Format 1A

| Information Type | No. of Bits | Purpose |
|---|---|---|
| Format 0/1A differentiation | 1 bit | Indicates whether format 0 or format 1A is used |
| Localized/Distributed VRB Assignment flag | 1 bit | Indicates whether virtual resource blocks (VRBs) are locally or distributively assigned |
| Resource block assignment | Variable | Indicates resource blocks to be assigned to the UE |
| Modulation and coding scheme | 5 bits | Indicates modulation scheme and, together with the number of allocated physical resource blocks, the transport block size |
| HARQ process number | 3 (FDD), 4(TDD) | Identifies the HARQ process the packet is associated with |
| New data indicator | 1 bit | Indicates whether the packet is a new transmission or a re-transmission |
| Redundancy version | 2 bits | Indentifies the redundancy version used for coding the packet |
| TPC command for PUCCH | 2 bits | Transmit power control command for adapting the transmit power on the Physical Uplink Control Channel (PUCCH) |
| Downlink assignment index | 2 bits (TDD only) | Number of downlink subframes for uplink ACK/NACK bundling |

Format 1A (Modified)

| Information Type | No. of Bits | Purpose |
|---|---|---|
| Format 0/1A differentiation | 1 bit | Indicates whether format 0 or format 1A is used |
| *Transmission scheme* | *1 bit* | *Indicates whether the transmission scheme used is transmit diversity or beamforming* |
| Resource block assignment | Variable | Indicates resource blocks to be assigned to the UE |
| Modulation and coding scheme | 5 bits | Indicates modulation scheme and, together with the number of allocated physical resource blocks, the transport block size |
| HARQ process number | 3 (FDD), 4(TDD) | Identifies the HARQ process the packet is associated with |
| New data indicator | 1 bit | Indicates whether the packet is a new transmission or a re-transmission |
| Redundancy version | 2 bits | Indentifies the redundancy version used for coding the packet |
| TPC command for PUCCH | 2 bits | Transmit power control command for adapting the transmit power on the Physical Uplink Control Channel (PUCCH) |
| Downlink assignment index | 2 bits (TDD only) | Number of downlink subframes for uplink ACK/NACK bundling |

FIG. 4B

Format 1

| Information Type | No. of Bits | Purpose |
|---|---|---|
| Resource allocation header | 1 bit | Indicates whether resource allocation type 0 or 1 is used |
| Resource block assignment | Variable | Indicates resource blocks to be assigned to the UE |
| Modulation and coding scheme | 5 bits | Indicates modulation scheme and, together with the number of allocated physical resource blocks, the transport block size |
| HARQ process number | 3 (FDD), 4(TDD) | Identifies the HARQ process the packet is associated with |
| New data indicator | 1 bit | Indicates whether the packet is a new transmission or a re-transmission |
| Redundancy version | 2 bits | Indentifies the redundancy version used for coding the packet |
| TPC command for PUCCH | 2 bits | Transmit power control command for adapting the transmit power on the Physical Uplink Control Channel (PUCCH) |
| Downlink assignment index | 2 bits (TDD only) | Number of downlink subframes for uplink ACK/NACK bundling |

Format 1 (Modified)

| Information Type | No. of Bits | Purpose |
|---|---|---|
| Resource allocation header | 1 bit | Indicates whether resource allocation type 0 or 1 is used |
| Resource block assignment | Variable | Indicates resource blocks to be assigned to the UE |
| Modulation and coding scheme | 4 bits | Indicates modulation scheme and, together with the number of allocated physical resource blocks, the transport block size |
| *Transmission scheme* | *1 bit* | *Indicates whether the transmission scheme used is transmit diversity or beamforming* |
| HARQ process number | 3 (FDD), 4(TDD) | Identifies the HARQ process the packet is associated with |
| New data indicator | 1 bit | Indicates whether the packet is a new transmission or a re-transmission |
| Redundancy version | 2 bits | Indentifies the redundancy version used for coding the packet |
| TPC command for PUCCH | 2 bits | Transmit power control command for adapting the transmit power on the Physical Uplink Control Channel (PUCCH) |
| Downlink assignment index | 2 bits (TDD only) | Number of downlink subframes for uplink ACK/NACK bundling |

FIG. 5B

METHOD AND APPARATUS FOR ENABLING MULTIPLE TRANSMISSION MODES BASED ON MULTIPLE SEARCH SPACES

CLAIM OF PRIORITY UNDER 35 U.S.C. §119

The present Application for patent claims benefit of U.S. Provisional Patent Application No. 61/144,082, entitled, "A Method and Apparatus for Enabling Multiple Transmission Modes in a Wireless Communication System," filed Jan. 12, 2009, assigned to the assignee hereof and hereby expressly incorporated by reference herein.

CROSS REFERENCE TO RELATED APPLICATIONS

The present Application is related by subject matter to U.S. patent application Ser. No. 12/685,239, entitled "METHOD AND APPARATUS FOR ENABLING MULTIPLE TRANSMISSION MODES IN A WIRELESS COMMUNICATION SYSTEM" filed herewith and assigned to the assignee hereof and hereby expressly incorporated by reference herein.

BACKGROUND

Field

Certain aspects of the present disclosure relate to wireless communication and, more particularly, to management of wireless connections.

Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

In a MIMO system, a wireless terminal may be configured with one of several transmission modes to enable certain features. When a wireless terminal is configured with Mode 7, it may receive downlink control information (DCI) using two possible DCI formats, namely, format 1A and format 1. It is currently proposed that each DCI format correspond to a certain transmission scheme. Specifically, DCI format 1A is used when using a transmit diversity transmission scheme, and format 1 is used in a beamforming transmission scheme. However, each transmission scheme has its own advantages and disadvantages. A "Mode 7" configuration intended to enable a beamforming transmission scheme will improve the directionality and performance of a transmission at the cost of possible channel feedback inaccuracy and latency, whereas a transmission scheme of transmit diversity may be more robust and still effectively utilize faded or weak signals.

SUMMARY

Certain aspects provide a method of enabling a transmission scheme in a wireless communication system. The method generally includes monitoring a plurality of search spaces, receiving control information in one of the search spaces, and transmitting data using a transmission scheme selected based on the search space in which the control information was received.

Certain aspects provide an apparatus for wireless communications. The apparatus generally includes a monitoring circuit configured to monitor a plurality of search spaces, a receiver configured to receive control information in one of the search spaces, and a transmitter configured to transmit data using a transmission scheme selected based on the search space in which the control information was received.

Certain aspects provide an apparatus for wireless communications. The apparatus generally includes means for monitoring a plurality of search spaces, means for receiving control information in one of the search spaces, and means for transmitting data using a transmission scheme selected based on the search space in which the control information was received.

Certain aspects provide a computer-program product for wireless communications comprising a computer readable medium having instructions stored thereon, the instructions being executable by one or more processors. The instructions generally include instructions for monitoring a plurality of search spaces, instructions for receiving control information in one of the search spaces, and instructions for transmitting data using a transmission scheme selected based on the search space in which the control information was received.

Certain aspects provide an apparatus for wireless communications. The apparatus generally includes at least one processor configured to monitor a plurality of search spaces, receive control information in one of the search spaces, and transmit data using a transmission scheme selected based on the search space in which the control information was received, and a memory coupled to the at least one processor.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 4A-B depict a conventional format and an example format for wireless communications in accordance with certain aspects of the present disclosure.

FIG. 5A-B depict a conventional format and an example format for wireless communications in accordance with certain aspects of the present disclosure.

DETAILED DESCRIPTION

Figure 1:
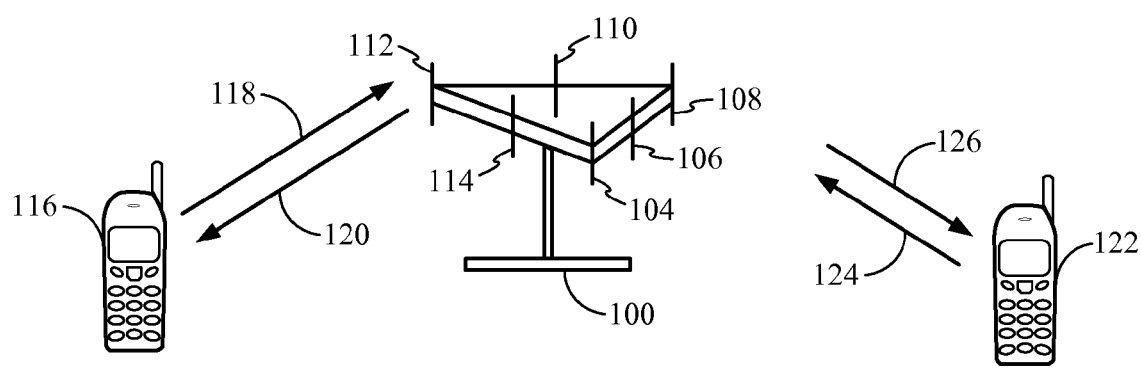
FIG. 1 illustrates an example wireless communication system in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In an FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 2:
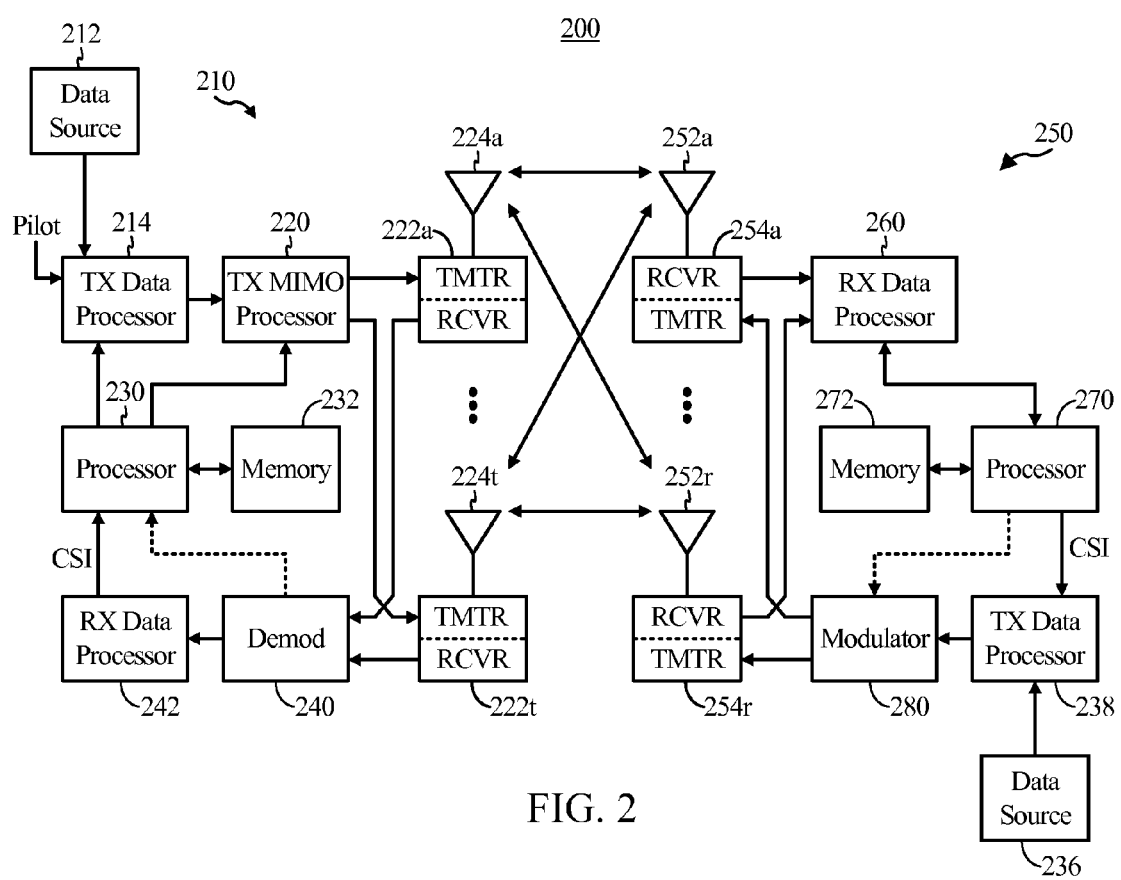
FIG. 2 illustrates a block diagram of an example access point and user terminal accordance with certain aspects of the present disclosure.

FIG. 2 is a block diagram of an embodiment of a transmitter system 210 (also known as the access point) and a receiver system 250 (also known as access terminal) in a MIMO system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK or M-QAM) selected for that data stream to provide modulation symbols. The data rate, coding and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, de-interleaves and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240 and processed by a RX data processor 242 to extract the reserve link message transmitted by the receiver system 250. Processor 230 then determines which pre-coding matrix to use for determining the beamforming weights then processes the extracted message.

In an aspect, logical channels are classified into Control Channels and Traffic Channels. Logical Control Channels comprise Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprise a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprise a Random Access Channel (RACH), a Request Channel (REQCH), an Uplink Shared Data Channel (UL-SDCH) and plurality of PHY channels. The PHY channels comprise a set of DL channels and UL channels.

The DL PHY channels may comprise, for example, a Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), and a Paging Indicator Channel (PICH), Load Indicator Channel (LICH).

The UL PHY Channels may comprise, for example, a Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH) and Broadband Pilot Channel (BPICH).

In an aspect, a channel structure is provided that preserves low PAR (at any given time, the channel is contiguous or uniformly spaced in frequency) properties of a single carrier waveform.

Enabling Multiple Transmission Modes Using Control Information

Certain aspects of the present disclosure may allow a transmission scheme to be specified. According to certain aspects, transmission schemes may be specified using different search spaces. For example, a UE may be required to monitor a common search space and a UE-specific search space. The UE may be consciously configured to utilize a specific transmission mode (e.g., mode 7) and use beamforming, most of the time. As a result, according to certain aspects, if a UE receives DL control information (DCI) in the common search space, it will be sent using transmit diversity. Otherwise, the DCI may be sent using beamforming.

According to certain aspects, a transmission scheme may be explicitly indicated when transmitting downlink control information (DCI) in certain formats. According to certain aspects, one or more bits of conventional DCI formats may be used to specify a transmission scheme to be used by a receiving entity. The supported transmission scheme may be, for example, either transmit diversity or beamforming.

The transmit diversity scheme may be utilized to achieve robustness, as well as for a fallback operation. If two or more DCI formats are associated with the same UE, only one DCI format may comprise the explicit indication about the transmission scheme. Other DCI formats may remain unchanged and may be utilized only for indicating the beamforming transmission scheme.

Figure 3:
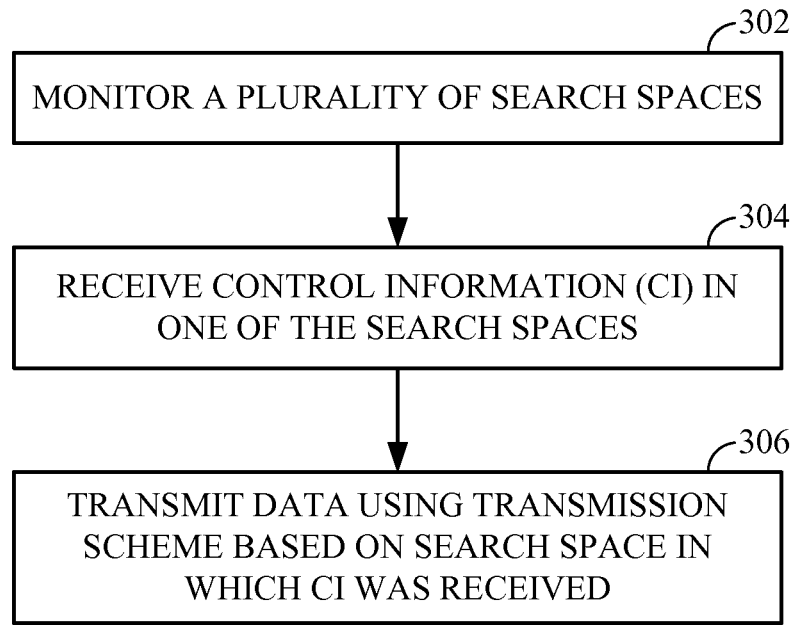
FIG. 3 illustrates an example operation that may be performed by user equipment in accordance with certain aspects of the present disclosure.
Figure 3A:
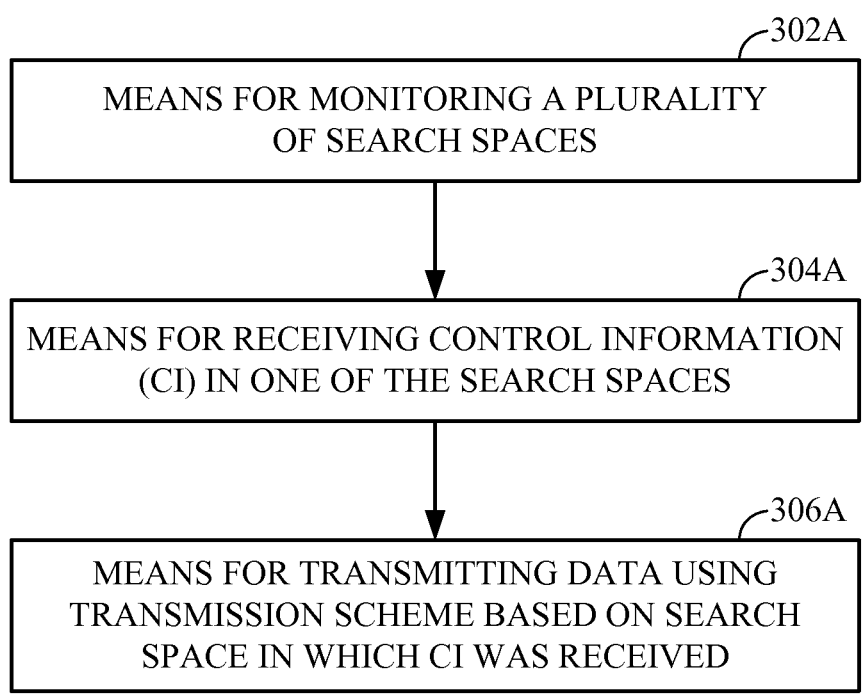
FIG. 3A illustrates example components capable of performing the operations illustrated in FIG. 3.

FIG. 3 illustrates example operations that may be performed, for example, by an access terminal, to indicate a transmission scheme when conveying DCI in different search spaces.

The operations begin, at 302, by monitoring a plurality of search spaces. A search space is a region including a plurality of resource elements (REs) and common control elements (CCEs). A search space may be classified as a common search space and an access-terminal-specific (or UE-specific) search space. A common search space may be monitored by all access terminals in an area. An access-terminal-specific search space may be monitored by at least one access terminal. The common search space and the access-terminal-specific search space may overlap each other. In one embodiment, an access terminal may be required to monitor both the common search space and the access-terminal specific search space.

At 304, the AT receives control information (CI) in one of the plurality of search spaces. An access terminal may use CI to transport downlink or uplink scheduling information. In one embodiment, an access terminal may receive Downlink Control Information (DCI) through a Physical Downlink Control Channel (PDCCH).

At 306, an access terminal may transmit data using a transmission scheme based on the search space in which the CI was received. In one embodiment, an access terminal may be configured to use a beamforming transmission scheme as a default transmission scheme. The access terminal may transmit data using the transmission scheme of transmit diversity if the access terminal receives CI in the common search space. Should the access terminal receive CI in another search space, such as in an access-terminal-specific search space, the access terminal may resume transmitting data using the beamforming transmission scheme.

In one embodiment of the disclosure presently disclosed, a method for enabling different transmission schemes may comprise re-interpreting at least one or more values in a CI format to indicate a transmission scheme.

FIGS. 4A and 5A depict formats for downlink control information (DCI). In one embodiment, a format for control information may be suitable for use in assignments of a downlink shared channel resource when no spatial multiplexing is used. In another embodiment, a suitable format may be a compact format used for assignment of a downlink shared channel resource when no spatial multiplexing is used. In the illustrated embodiment, formats for control information may be Downlink Control Information Format 1A and 1, as depicted in FIGS. 4A and 5A, respectively.

Referring to FIG. 4A, in an embodiment of the disclosure, DCI Format 1A may comprise several information fields suitable for indicating a transmission scheme. In one embodiment, the 1-bit Localized/Distributed Virtual Resource Block (VRB) Assignment flag, marked at 402, may be used. In one embodiment, the Localized/Distributed VRB Assignment flag may be set to a first value to indicate a transmit diversity transmission scheme. Similarly, the Localized/Distributed VRB Assignment flag may be set to a second value to indicate a beamforming transmission scheme. In one embodiment, the first value may be equal to zero, while the second value may be equal to a defined non-zero value.

It is contemplated that the re-interpretation of an information field in a DCI format may result in loss of flexibility in features. In one embodiment, re-interpreting the Localized/Distributed VRB Assignment flag for use in indicating a transmission scheme may lose the flexibility of indicating dynamic switching between localized and distributed VRB resource allocations. However, such switching may still be done using, in one embodiment, a semi-static approach using higher layer signaling. In another embodiment, a fixed VRB scheme, using either localized or distributed VRB, can be specified.

FIG. 4B depicts a modified format for DCI, in accordance with aspects of the present disclosure. In one embodiment, a modified DCI Format 1A may comprise a 1-bit flag for indicating a transmission scheme, marked at 404, in place of the 1-bit Localized/Distributed VRB Assignment flag.

Referring to FIG. 5A, in an embodiment of the disclosure, DCI Format 1 may comprise several information fields suitable for indicating a transmission scheme. In one embodiment, the Modulation and Coding Scheme information field 502A, comprising 5 bits, may be used. Referring to FIG. 5B, in one embodiment, the Modulation and Coding Scheme information field may be separated into a Modulation and Coding Scheme information field 502B, now comprising 4 bits, and a Transmission Scheme flag 504, comprising 1 bit. The Transmission Scheme flag 504 may be set to a first value to indicate a transmit diversity transmission scheme, and may be set to a second value to indicate a beamforming transmission scheme.

It is contemplated that another information field in a DCI format may be used to indicate a transmission scheme. It is also contemplated that the re-interpreted information field may comprise one bit or more. It is further contemplated that a plurality of values may be used to indicate at least a transmission scheme and other information relating to the transmission scheme.

Figure 6:
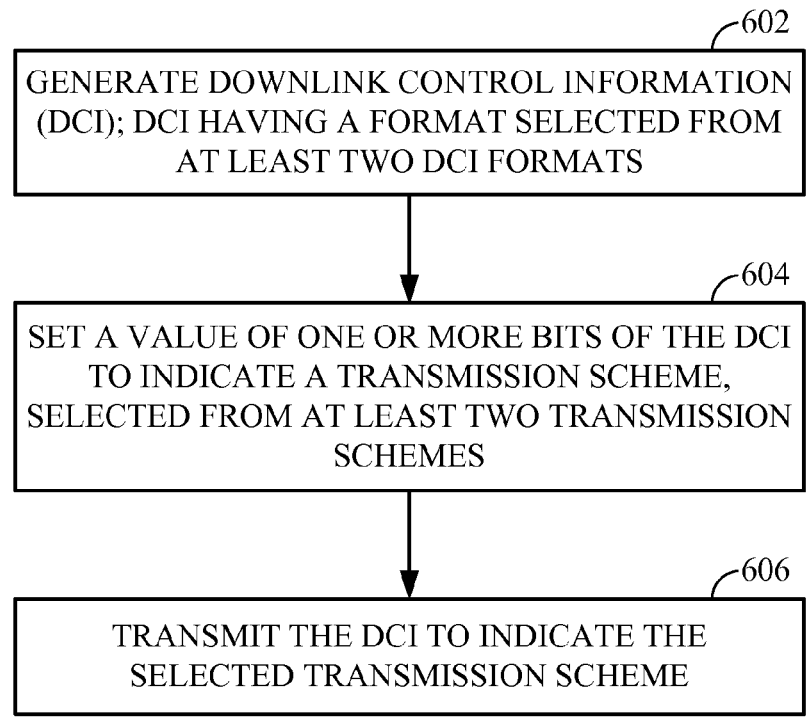
FIG. 6 illustrates an example operation that may be performed by access point in accordance with certain aspects of the present disclosure.
Figure 6A:
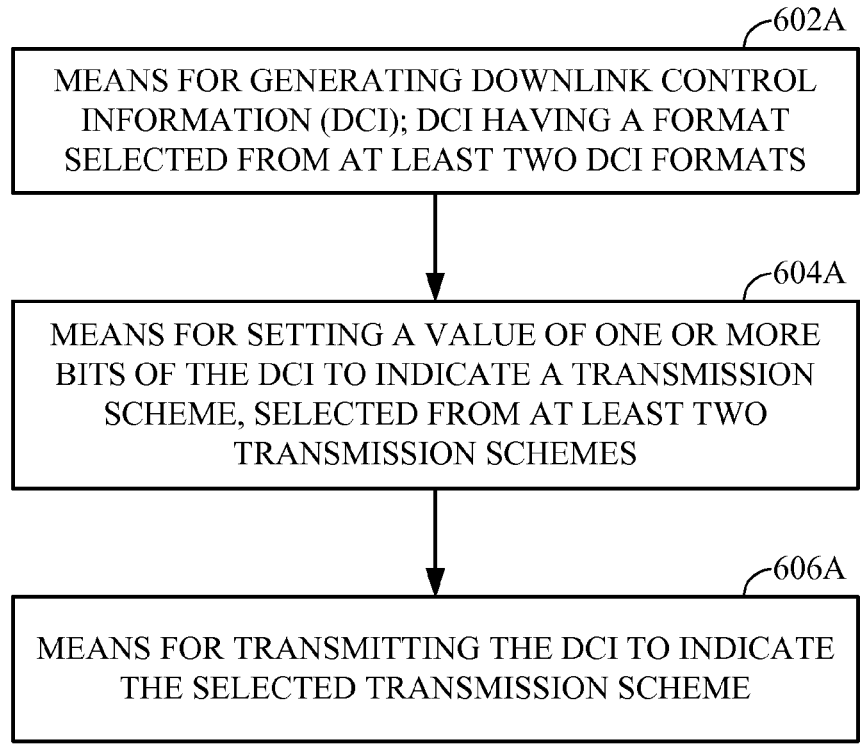
FIG. 6A illustrates example components capable of performing the operations illustrated in FIG. 6.

FIG. 6 illustrates an example operation that may be performed by an access point to enable multiple transmission modes. The illustrated operations may be performed by any suitable components, such as the APs described above with reference to FIGS. 1-2.

The operation 600 begins, at 602, by generating downlink control information (DCI), wherein the DCI has a format selected at least two DCI formats. In one embodiment, as described and illustrated in FIGS. 4A-B and 5A-B, the format may be selected from at least DCI Format 1 and DCI Format 1A. It is contemplated that other DCI formats, such as DCI format 0 or DCI format 2, may be suitable.

At 604, an access point may set a value of one or more bits of the DCI to indicate a transmission scheme, the transmission scheme selected from at least two transmission schemes. In one embodiment, the transmission schemes available for selection are beamforming and transmit diversity.

At 606, an access point may transmit the DCI to an element, such as another access point or an access terminal, to indicate the selected transmission scheme.

Figure 7:
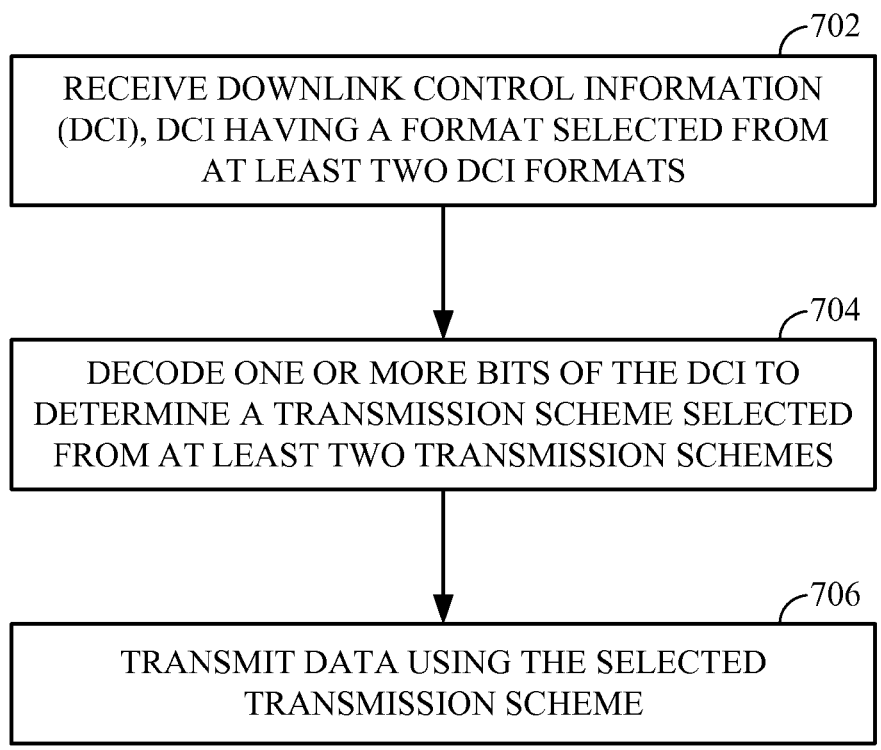
FIG. 7 illustrates an example operation that may be performed by access terminal in accordance with certain aspects of the present disclosure.
Figure 7A:
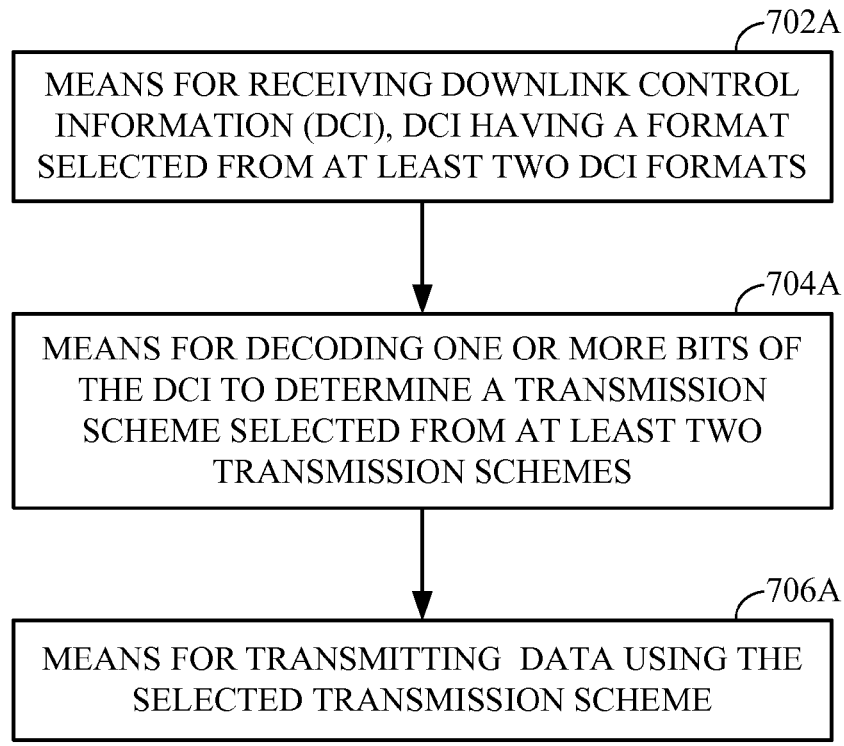
FIG. 7A illustrates example components capable of performing the operations illustrated in FIG. 7.

FIG. 7 illustrates an example operation that may be performed by access terminal to enable multiple transmission modes. The illustrated operations may be performed by any suitable components, such as the ATs described above with reference to FIGS. 1-2.

The operation 700 begins, at 702, by receiving DCI, the DCI having a format selected from at least two DCI formats. In one embodiment, the format may be selected from at least DCI Format 1 and DCI Format 1A.

At 704, an access terminal may decode one or more bits of the DCI to determine a transmission scheme selected at least two transmission schemes. As described above, in one embodiment, the transmission schemes may comprise beamforming and transmit diversity. In one embodiment, a non-null value of one or more bits relating to the Localized/Distributed VRB Resource Flag of the DCI in a DCI Format 1A, as depicted in FIG. 4A-B, may indicate a beamforming transmission scheme. Conversely, in one embodiment, a null value in one or more bits relating to the Localized/Distributed VRB Resource Flag may indicate a transmit diversity transmission scheme.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits and algorithm steps described in connection with the embodiments disclosed herein may be implemented as electronic hardware, computer software or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

While the foregoing is directed to embodiments of the present disclosure, other and further embodiments of the disclosure may be devised without departing from the basic scope thereof, and the scope thereof is determined by the claims that follow.

The invention claimed is:

1. A method for wireless communications, comprising:
   monitoring a plurality of search spaces;
   receiving control information in one of the search spaces; and
   transmitting data using a transmission scheme selected based on the search space in which the control information was received.

2. The method of claim 1, wherein the transmission scheme selected comprises at least one of: beamforming and transmit diversity.

3. The method of claim 1, wherein transmitting data further comprising:
   transmitting data using a beamforming transmission scheme based on the determination that the control information was received in a user-equipment-specific search space.

4. The method of claim 1, wherein transmitting data further comprising:
   transmitting data using a transmit diversity transmission scheme based on the determination that the control information was received in a common search space.

5. The method of claim 1, wherein the control information comprises downlink control information (DCI) having DCI format 1A.

6. The method of claim 1, wherein the plurality of search spaces comprises common search space and user-equipment-specific search space.

7. An apparatus for wireless communications, comprising:
   a monitoring circuit configured to monitor a plurality of search spaces;
   a receiver configured to receive control information in one of the search spaces; and
   a transmitter configured to transmit data using a transmission scheme selected based on the search space in which the control information was received.

8. The apparatus of claim 7, wherein the transmission scheme selected comprises at least one of: beamforming and transmit diversity.

9. The apparatus of claim 7, wherein the transmitter is also configured to
   transmit data using a beamforming transmission scheme based on the determination that the control information was received in a user-equipment-specific search space.

10. The apparatus of claim 7, wherein the transmitter is also configured to
    transmit data using a transmit diversity transmission scheme based on the determination that the control information was received in a common search space.

11. The apparatus of claim 7, wherein the control information comprises downlink control information (DCI) having DCI format 1A.

12. The apparatus of claim 7, wherein the plurality of search spaces comprises common search space and user-equipment-specific search space.

13. An apparatus for wireless communications, comprising:
    means for monitoring a plurality of search spaces;
    means for receiving control information in one of the search spaces; and
    means for transmitting data using a transmission scheme selected based on the search space in which the control information was received.

14. The apparatus of claim 13, wherein the transmission scheme selected comprises at least one of: beamforming and transmit diversity.

15. The apparatus of claim 13, wherein the means for transmitting is further configured to
    transmit data using a beamforming transmission scheme based on the determination that the control information was received in a user-equipment-specific search space.

16. The apparatus of claim 13, wherein the means for transmitting is further configured to
    transmit data using a transmit diversity transmission scheme based on the determination that the control information was received in a common search space.

17. The apparatus of claim 13, wherein the control information comprises downlink control information (DCI) having DCI format 1A.

18. The apparatus of claim 13, wherein the plurality of search spaces comprises common search space and user-equipment-specific search space.

19. A computer-program product for wireless communications, comprising a computer readable medium having instructions stored thereon, the instructions being executable by one or more processors and the instructions comprising:
    instructions for monitoring a plurality of search spaces;
    instructions for receiving control information in one of the search spaces; and
    instructions for transmitting data using a transmission scheme selected based on the search space in which the control information was received.

20. The computer-program product of claim 19, wherein the transmission scheme selected comprises at least one of: beamforming and transmit diversity.

21. The computer-program product of claim 19, wherein the instructions further comprise:
    instructions for transmitting data using a beamforming transmission scheme based on the determination that the control information was received in a user-equipment-specific search space.

22. The computer-program product of claim 19, wherein the instructions further comprise:
    instructions for transmitting data using a transmit diversity transmission scheme based on the determination that the control information was received in a common search space.

23. The computer-program product of claim 19, wherein the control information comprises downlink control information (DCI) having DCI format 1A.

24. The computer-program product of claim 19, wherein the plurality of search spaces comprises common search space and user-equipment-specific search space.

25. An apparatus for wireless communications, comprising:
    at least one processor configured to
      monitor a plurality of search spaces,
      receive control information in one of the search spaces, and
      transmit data using a transmission scheme selected based on the search space in which the control information was received; and
    a memory coupled to the at least one processor.

26. The apparatus of claim 25, wherein the transmission scheme selected comprises at least one of: beamforming and transmit diversity.

27. The apparatus of claim 25, wherein the processor is further configured to
    transmit data using a beamforming transmission scheme based on the determination that the control information was received in a user-equipment-specific search space.

28. The apparatus of claim 25, wherein the processor is further configured to
    transmit data using a transmit diversity transmission scheme based on the determination that the control information was received in a common search space.

29. The apparatus of claim 25, wherein the control information comprises downlink control information (DCI) having DCI format 1A.

30. The apparatus of claim 25, wherein the plurality of search spaces comprises common search space and user-equipment-specific search space.

* * * * *